United States Patent [19]

Itoh et al.

[11] Patent Number: 4,974,861
[45] Date of Patent: Dec. 4, 1990

[54] HEIGHT CONTROL DEVICE FOR A VEHICLE

[75] Inventors: Takaaki Itoh; Rihee Yoshida, both of Hiroshima; Isao Umiguchi, Otake, all of Japan

[73] Assignee: Mazda Motor Corporation, Hiroshima, Japan

[21] Appl. No.: 429,364

[22] Filed: Oct. 31, 1989

[30] Foreign Application Priority Data

Oct. 31, 1988 [JP] Japan ................ 63-275046

[51] Int. Cl.$^5$ ........................................ B60G 17/052
[52] U.S. Cl. .................................... 280/6.1; 280/711; 280/714; 280/DIG. 1
[58] Field of Search ................. 280/702, 708, DIG. 1, 280/840, 6.1, 6.12, 711, 712, 714

[56] References Cited

U.S. PATENT DOCUMENTS

| | | | |
|---|---|---|---|
| 2,887,324 | 5/1959 | Jackson | 280/6.1 |
| 2,923,557 | 2/1960 | Schilling et al. | 280/6.12 |
| 4,105,216 | 8/1978 | Graham et al. | 280/840 |

FOREIGN PATENT DOCUMENTS

| | | | |
|---|---|---|---|
| 1158386 | 3/1961 | Fed. Rep. of Germany | 280/702 |
| 60-72712 | 5/1985 | Japan | |

Primary Examiner—Charles A. Marmor
Assistant Examiner—Karin Tyson
Attorney, Agent, or Firm—Wenderoth, Lind & Ponack

[57] ABSTRACT

A height control device for a vehicle for maintaining constant a height from a wheel-side member to a body-side member of the vehicle, includes expansive operation means provided on the wheel-side member to support the body-side member and adapted to be expanded and contracted in a direction of the vehicle height by supplying and discharging an operating fluid with respect thereto. Link means is provided between the wheel-side member and the body-side member to connect each other and is adapted to be operated in response to a change in height between the wheel-side member and the body-side members. Control means is connected to an operation output portion of the link means to control supply, discharge and stop of the operating fluid with respect to the expansive operation means in response to the operation of the link means. Damper means is provided at the operation output portion of the link means to damp relatively short fluctuating movement operation of the link means to restrict responsive operation of the control means and to allow a relatively long ordinary operation of the link means to responsively operate the control means. Elastic means is provided at a portion of the link means on the side of the wheel-side member distant from the operation output portion connected to the control means to elastically absorb and accumulate an operating force of the link means to ordinarily operate the link means.

18 Claims, 2 Drawing Sheets

HEIGHT CONTROL DEVICE FOR A VEHICLE

BACKGROUND OF THE INVENTION

1. Field of the Invention

The present invention relates to a height control device for vehicle to be used for maintaining always constant a distance between a wheel-side member and a frame-side member of a vehicle.

2. Description of the Prior Art

Conventionally in a vehicle, for example, a load carrying vehicle such as a truck, a height control device for vehicle is used to maintain always constant a vehicle height under a load condition and an unload condition. There are various types in such a height control device for vehicle. For example, Japanese Utility Model Laid-open Publication No. 60-72712 discloses a height control device for vehicle including a vehicle height control valve mounted to a vehicle body side, a link mechanism for connecting the vehicle height control valve to an axle case, an expansion mechanism mounted to the link mechanism, and driving means for operating the expansion mechanism. In this device, a vehicle height is detected by the link mechanism, and is adjusted by the vehicle height control valve to be mechanically operated by the link mechanism.

In another height control device for vehicle excluding such an expansion mechanism and driving means as mentioned above, a vehicle height control valve is mounted to a sprung member of a vehicle, e.g., a vehicle frame, and a link mechanism is provided to connect the vehicle height control valve to an unsprung member of the vehicle, e.g., an axle case. In this height control device for vehicle, the link mechanism is operated by relative displacement between the vehicle frame and the axle case under the load condition and the unload condition, and the vehicle height control valve is operated by the movement of the link mechanism to adjust the vehicle height. That is, when the vehicle is loaded, the link mechanism adjusts the vehicle height control valve to an air induction side, thereby including the air into an air spring connected to a load carrying platform of the vehicle to lift the platform. Reversely, when the vehicle is unloaded, the link mechanism adjusts the vehicle height control valve to an air discharge side, thereby discharging the air from the air spring to lower the platform of the vehicle.

However, in both the height control devices for vehicle as mentioned above, since the link mechanism is directly connected to the vehicle height control valve mounted to the sprung member of the vehicle and to the unsprung member of the vehicle, a high sensibility is undesirably provided to the vehicle height control valve. Accordingly, the vehicle height control valve is sensitively operated to open and close in response to vertical motion of tires to induce and discharge the air with respect to the air spring even during normal running of the vehicle. That is, the vehicle height is changed with high-frequency vibration during running of the vehicle. Therefore, particularly in the load carrying vehicle, vertical vibration of the platform of the vehicle is amplified by the above operation during running of the vehicle.

Further, U.S. Pat. No. 4,105,216 has proposed that momentary height change from a target height level is ignored not to conduct height control by means of electrical signal processing techniques. However, this proposal is directed to an electronic height control device, and it has not solved the problem in the mechanical height control device for vehicle.

SUMMARY OF THE INVENTION

It is an object of the present invention to provide a mechanical height control device for vehicle which may maintain a vehicle height constant irrespective of change in load on the vehicle and also suppress the operation of a vehicle height control means in response to high-frequency vibration during running of the vehicle.

To attain the object, the invention provides a height control device for vehicle for maintaining constant a height from a wheel-side member to a body-side member of a vehicle, comprising expansive operation means provided on the wheel-side member to support the body-side member and adapted to be expanded and contracted in a direction of the vehicle height by supplying and discharging an operating fluid with respect thereto; link means provided between the wheel-side member and the body-side member to connect each other and adpated to be operated in response to a change in the height between the wheel-side member and the body-side member; control means connected to an operation output portion of the link means to control supply, discharge and stop of the operating fluid with respect to the expansive operation means in response to the operation of the link means; damper means provided at the operation output portion of the link means to damp a relatively short fluctuating operation of the link means to restrict a responsive operation of the control means and to allow a relatively long ordinary operation of the link means to responsively operate the control means; and elastic means provided at a portion of the link means on the side of the wheel-side member away from the operation output portion connected to the control means to elastically absorb and accumulate an operating force of the link means to ordinarily operate the link means.

With this arrangement, when the load on the vehicle is changed, the elastic means operates to elastically absorb and accumulate the operating force of the link means caused by the load change. Then, the operating force accumulated by the elastic means ordinarily operates the link means. As a result, the damper means allows a relatively long ordinary operation of the link means to responsively operate the control means and thereby expand or contract the expansive operation means. Thus, the vehicle height can be maintained constant irrespective of the load change.

On the other hand, while verticle vibration is transmitted from a road surface to the wheel-side member of the vehicle during running of the vehicle, the elastic means mounted to the wheel-side member operates to temporarily absorb the vibration, and the damper means operates to prevent rapid operation of the control means. Therefore, the control means is suppressed from being operated in response to the high-frequency vibration during running of the vehicle, thereby preventing expansion and contraction of the expansive operation means.

The control means stops the supply and the discharge of the operating fluid with respect to the expansive operation means when the link means is in a neutral position, supplies the operating fluid to the expansive operation means when the link means is operated in one direction, and discharges the operating fluid from the expansive operation means when the link means is operated in the other direction counter to the one direction. The control means is mounted to the body-side member. The control means is provided between a pressure air source and the expansive operation means. The control means may be a vehicle height control valve. In this case, the vehicle height control valve may be constructed of a three-way selector valve having a rotary valve member connected to the link means and adapted to be rotationally driven by the link means, the three-way selector valve being connected to an air induction line communicated with the pressure air source, an air feeding line connected with the expansive operation means and an air relieving line communicated with the atmosphere, and the valve member having a wall portion for closing the air feeding line and a communication passage for communicating the air feeding line with either of the air induction line or the air relieving line.

The body-side member may be a vehicle frame.

The wheel-side member may be an axle case.

The expansive operation means may be an air spring.

The link means is provided between the wheel-side member and the control means mounted to the body-side member. The link means comprises a first link connected to the control means, a second link connected to the wheel-side member, and a third link for pivotably connecting the first link with the second link.

The damper means is pivotably connected between the operation output portion of the link means and the body-side member. The damper means may comprise a cylinder pivotably connected to the operation output portion of the link means and being filled with oil therein, a piston rod having one end inserted in the cylinder and the other end pivotably connected to the body-side member, a piston connected to the one end of the piston rod and adapted to be slidably moved in the cylinder for urging the oil and an orifice formed through the piston for communication of the oil therethrough to restrict a movement of the oil to generate a damping force when the piston is going to rapidly move and to allow the movement of the oil when the piston moves slowly. The damper means may further comprise a movable partition board provided in the cylinder to define a gas chamber in the cylinder for removing a high-frequency component of vibration.

The elastic means is formed of a rubber material. The elastic means is fixedly provided between the wheel-side member and an end of the link means on the side of the wheel-side member to elastically absorb and accumulate a relative moving force between the wheel-side member and the end of the link means and thereby ordinarily operate the link means. The elastic means may be so constructed as to elastically absorb and accumulate a torsional energy due to relative rotational displacement between the wheel-side member and the end of the link means on the side of the wheel-side member and thereby ordinarily operate the link means.

DESCRIPTION OF THE PREFERRED EMBODIMENT

There will now be described a preferred embodiment of the present invention with reference to the drawings.

Figure 1:
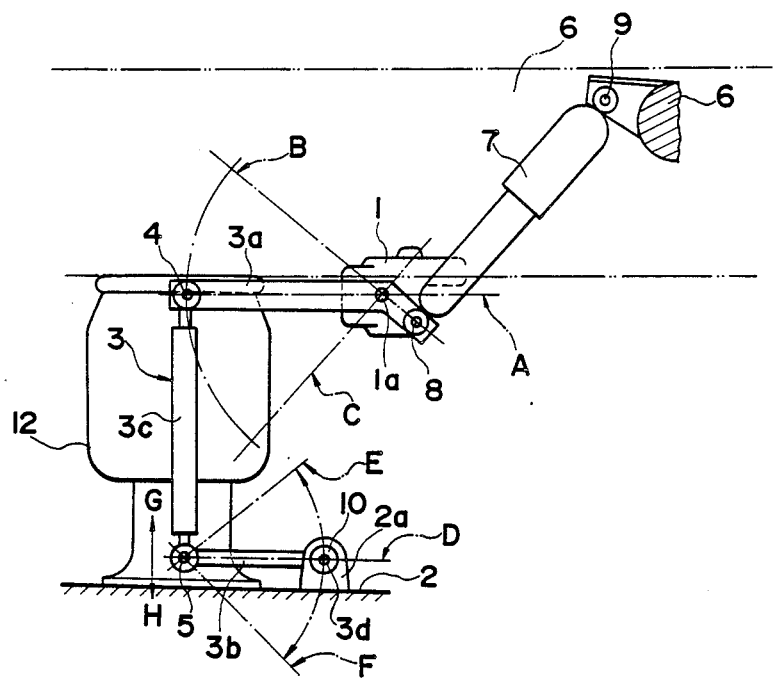
FIG. 1 is a schematic side view of the height control device for vehicle according to the present invention.

As shown in FIG. 1, a vehicle height control valve 1 is mounted to a sprung member of a vehicle, e.g., a vehicle frame 6. The vehicle height control valve 1 is interposed between a pressure air source (not shown) and an air spring 12 for raising and lowering the vehicle frame 6 to control flow of air into and out of the air spring 12.

A link mechanism 3 is interposed between an unsprung member of the vehicle, e.g., an axle case 2 and the vehicle height control valve 1. The link mechanism 3 is comprised of a first link 3a connected to a line selecting shaft 1a of the vehicle height control valve 1, a second link 3b connected to the axle case 2, and a third link 3c connecting the first link 3a with the second link 3b. Reference numeral 4 designates a pivot shaft interposed between the first link 3a and the third link 3c, and reference numeral 5 designates a pivot shaft interposed between the second link 3b and the third link 3c. The vehicle height control valve 1 is in a closed condition when the first link 3a is in a neutral position A. When the first link 3a is rotated to a position B to thereby rotate the line selecting shaft 1a, the vehicle height control valve 1 allows the pressure air source to be communicated with the air spring 12. Further, when the first link 3a is reversely rotated to a position C to thereby reversely rotate the line selecting shaft 1a, the vehicle height control valve 1 allows the air in the air spring 12 to be relieved to the atmosphere.

Figure 3A:
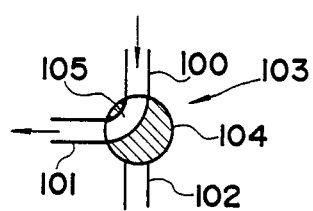
FIGS. 3A and 3B are schematic illustration of the operation of the vehicle height control valve.
Figure 3B:
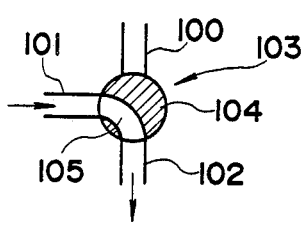

As shown in FIGS. 3A and 3B, the vehicle height control valve 1 is constructed of a three-way selector valve connected to an air induction line 100 connected to the pressure air source, an air feeding line 101 connected to the air spring 12, and an air relieving line 102 opening to the atmosphere. A valve member 103 of the vehicle height control valve 1 is of a rotary type, then a wall portion 104 of the valve member 103 may close the air feeding line 101, or a communication passage 105 formed in the valve member 103 may communicate the air feeding line 101 with eigher of the air induction line 100 or the air relieving line 102. The valve member 103 is connected to the line selecting shaft 1a to be rotationally driven by the first link 3a. That is, the line selecting shaft 1a is rotated by the rotating motion of the first link 3a to thereby close the air feeding line 101, or communicate the same with either of the air induction line 100 or the air relieving line 102. Thus, the pressure air can be supplied to or discharged from the air spring 12 through the vehicle height control valve 1, or flowing of the pressure air can be stopped by the vehicle height control valve 1.

A damper 7 is interposed between the vehicle frame 6 and an end portion of the first link 3a on the opposite side of the pivot shaft 4. One end of the damper 7 is connected through a pivot shaft 8 to the first link 3a, and the other end of the same is connected through a pivot shaft 9 to the vehicle frame 6. The damper 7 functions to prevent rapid rotation of the first link 3a.

Figure 4:
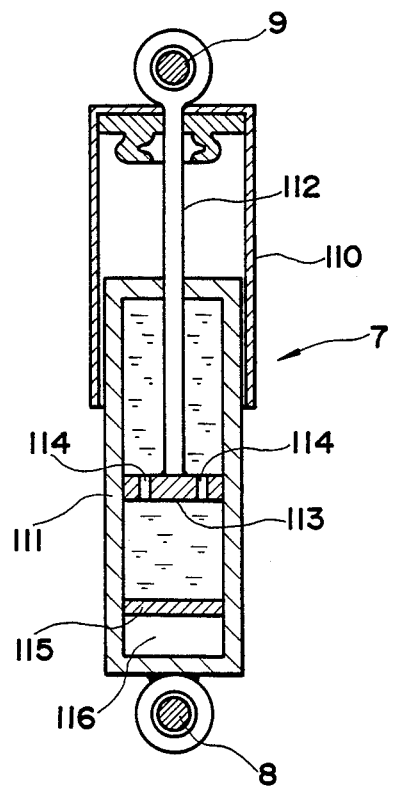
FIG. 4 is a schematic side sectional view of the damper.

As shown in FIG. 4, the damper 7 is comprised of a hollow cylindrical casing 110, a cylinder 111 having one end connected through the pivot shaft 8 to the first link 3a and the other end slidably inserted in the casing 110 and being filled with an oil therein, a piston rod 112 having one end inserted in the cylinder 111 and the other end connected through the pivot shaft 9 to the vehicle frame 6, and a piston 113 connected to the one end of the piston rod 112 and relatively slidably provided in the cylinder 111. A movable partition board 115 is provided in the cylinder 111 to define a gas chamber 116 in the cylinder 111 for removing a high-frequency component of vibration. The other end of the piston rod 112 is fixed to the casing 110. The piston 113 is formed with a plurality of orifices 114 for moving the oil in the cylinder 111 in association with the sliding movement of the piston 113. Thus, the damper 7 functions to generate a damping force by moving the piston 113 to allow the oil to pass through the orifices 114 of the piston 113. Specifically, when the piston 113 is rapidly moved, the orifices 114 function to restrict the movement of the oil in the cylinder 111 to thereby generate a large damping force, while when the piston 113 is slowly moved, the orifices 114 hardly function so as not to generate a damping force.

Figure 2:
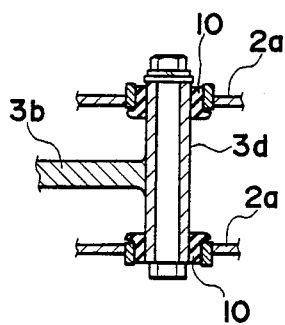
FIG. 2 is a cross section taken along the line D in FIG. 1.

As shown in FIG. 2, a shaft 3d is integrally fixed to one end of the second link 3b, and a pair of torsion rubber bushes 10 are interposed between the shaft 3d of the second link 3b and a pair of brackets 2a projecting upright from the axle case 2. Thus, the second link 3b and the axle case 2 are connected with each other through the torsion rubber bushes 10. Specifically, an inner circumferential surface of each torsion rubber bush 10 is fixed to the shaft 3d, and an outer circumferential surface of each torsion rubber bush 10 is fixed to each bracket 2a. The torsion rubber bush 10 is formed of an elastic material such as a rubber material, and functions to temporarily absorb relative displacement in a vertical direction between the axle case 2 and the vehicle frame 6, and also accumulate a torsional force corresponding to the relative displacement and then make the first link 3a operate by the accumulating torsional force.

The operation of the above-mentioned preferred embodiment will now be described.

First, there will be described a normal vehicle height control operation. When a load carrying platform (not shown) fixed to the vehicle frame 6 is loaded, the unsprung member of the vehicle receives an upward force from a road surface, and then the axle case 2 is accordingly rotationally displaced from a neutral position D to a load position E. At this time, the torsion rubber bushes 10 accumulate a torsional force, that is a torsional energy, to be generated by the relative rotation of the shaft 3d with respect to the brackets 2a. On the other hand, as the damper 7 is not rapidly moved at this time, the second link 3b only in the link mechanism 3 is rotated, and the first link 3a and the third link 3c are not rotated.

Maintaining the load condition for a period of time, the third link 3c is gradually displaced in a direction G by the torsional force accumulated in the torsion rubber bushes 10. As a result, the first link 3a is gradually rotated to the position B. At this time, the damper 7 is gradually expanded to allow the rotational displacement of the first link 3a. When the first link 3a comes to the position B, the vehicle height control valve 1 communicates the pressure air source with the air spring 12. Accordingly, the air spring 12 raises the load carrying platform by an amount corresponding to the rotational amount of the first link 3a.

Thereafter, when the load carrying platform of the vehicle is unloaded, the axle case 2 is rotationally displaced to a position F relative to the third link 3c, and the torsion rubber bushes 10 accumulate a torsional force in a direction counter to that mentioned above. In the same manner as the above, the damper 7 is not rapidly moved at this time, and the second link 3b only is rotationally displaced just after unloading the platform of the vehicle. Maintaining the unload condition for a period of time, the third link 3c is displaced in a direction H by the torsional force accumulated in the torsion rubber bushes 10, and the first link 3a is gradually rotated to the position C as contracting the damper 7. When the first link 3a comes to the position C, the vehicle height control valve 1 relieves the air in the air spring 12 to the atmosphere and lowers the load carrying platform of the vehicle by an amount corresponding to the rotational amount of the first link 3a.

During running of the vehicle, vibration to be received from the road surface to the vehicle is absorbed by rotational displacement in the directions E-F of the second link 3b provided with the torsion rubber bushes 10. At this time, the first link 3a and the third link 3c are suppressed from rotating by the operation of the damper 7. Accordingly, the vehicle height control valve 1 is not operated, and the vertical movement of the platform of the vehicle by the air spring 12 is prevented.

As mentioned above, while the damper 7 is interposed between the vehicle frame 6 and the first link 3a and the torsion rubber bushes 10 are interposed between the second link 3b and the axle case 2, the damper 7 must be located on the side of the vehicle frame 6 far from the torsion rubber bushes 10, so that the vibration from the road surface during running of the vehicle may be absorbed by the torsion rubber bushes 10 without operating the vehicle height control valve 1. Further, if the torsion rubber bushes 10 were located at the connecting position between the damper 7 and the first link 3a, the first link 3a would be rotated to operate the vehicle height control valve 1. Therefore, the torsion rubber bushes 10 must be located at a position where the first link 3a is not rotated in time of loading the platform.

As described above, the height control device for vehicle of the invention can maintain a vehicle height constant irrespective of a change in load on the vehicle and also suppress the operation of the vehicle height control valve in response to the high-frequency vibration during running of the vehicle.

What is claimed is:

1. A height control device for a vehicle for maintaining constant a height from a wheel-side member to a body-side member of the vehicle said device comprising expansive operation means provided on said wheel-side member to support said body-side member and adapted to be expanded and contracted in a direction of the vehicle height by supplying and discharging an operating fluid with respect thereto;

link means provided between said wheel-side member and said body-side member to connect each other and adapted to be operated in response to a change in the height between said wheel-side member and said body-side member;

control means connected to an operation output portion of said link means to control supply, discharge and stop of said operating fluid with respect to said expansive operation means in response to the operation of said link means;

damper means provided at said operation output portion of said link means to damp relatively short fluctuating operation of said link means to restrict operation of said control means and to allow a relatively long ordinary operation of said link means to responsively operate said control means; and elastic means provided at a portion of said link means on the side of said wheel-side member away from said operation output portion connected to said control means to elastically absorb and accumulate an operating force of said link means to ordinarily operate said link means.

2. The height control device for a vehicle as claimed in claim 1, wherein said control means stops the supply and the discharge of said operating fluid with respect to said expansive operation means when said link means is in a neutral position, supplies said operating fluid to said expansive operation means when said link means is operated in one direction, and discharges said operating fluid from said expansive operation means when said link means is operated in another direction counter to said one direction.

3. The height control device for a vehicle as claimed in claim 1, wherein said control means is mounted to said body-side member.

4. The height control device for a vehicle as claimed in claim 1, wherein said control means is provided between a pressure air source and said expansive operation means.

5. The height control device for a vehicle as claimed in claim 1, wherein said control means comprises a vehicle height control valve.

6. The height control device for a vehicle as claimed in claim 5, wherein said vehicle height control valve is constructed as a three-way selector valve having a rotary valve member connected to said link means and adapted to be rotatably driven by said link means, said three-way selector valve being connected to an air induction line communicated with said pressure air source, an air feeding line communicated with said expansive operation means and an air relieving line communicated with the atmosphere, and said valve member having a wall portion for closing said air feeding line and a communication passage for communicating said air feeding line with either of said air induction line or said air relieving line.

7. The height control device for a vehicle as claimed in claim 1, wherein said body-side member is a vehicle frame.

8. The height control device for a vehicle as claimed in claim 1, wherein said wheel-side member is an axle case.

9. The height control device for a vehicle as claimed in claim 1, wherein said expansive operation means comprises an air spring.

10. The height control device for a vehicle as claimed in claim 1, wherein said link means is provided between said wheel-side member and said control means mounted to said body-side member.

11. The height control device for a vehicle as claimed in claim 10, wherein said link means comprises a first link connected to said control means, a second link connected to said wheel-side member, and a third link pivotably connecting said first link with said second link.

12. The height control device for a vehicle as claimed in claim 1, wherein said damper means is pivotably connected between said operation output portion of said link means and said body-side member.

13. The height control device for a vehicle as claimed in claim 12, wherein said damper means comprises a cylinder pivotally connected to said operation output portion of said link means and filled with oil, a piston rod having one end inserted in said cylinder and another end pivotally connected to said body-side member, a piston connected to said one end of said piston rod and adapted to be slidably moved in said cylinder for urging said oil, and an orifice formed through said piston for communication of said oil therethrough to restrict a movement of said oil to generate a damping force when said piston is rapidly moved and to allow movement of said oil when said piston moves slowly.

14. The height control device for a vehicle as claimed in claim 13, wherein said damper means further comprises a movable partition board provided in said cylinder to define a gas chamber in said cylinder for removing a high-frequency component of vibration.

15. The height control device for a vehicle as claimed in claim 1, wherein said elastic means is formed of a rubber material.

16. The height control device for a vehicle as claimed in claim 1, wherein said elastic means is fixedly provided between said wheel-side member and an end of said link means on the side of said wheel-side member to elastically absorb and accumulate a relative moving forced between said wheel-side member and said end of said wheel-side member and said end of said link means 17. The height control device for vehicle as claimed in claim 16, wherein said elastic means is so constructed as to elastically absorb and accumulate a torsional energy due to relative rotational displacement between said wheel-side member and the end of said link means on the side of said wheel-side member and thereby ordinarily operate said link means.

18. A height control device for vehicle for maintaining constant a height from an axle case of the vehicle to a vehicle frame, said device comprising an air spring provided on said axle case to support said vehicle frame and adapted to be expanded and contracted in a direction of the vehicle height by supplying and discharging an operating fluid with respect thereto;

a link mechanism provided between said axle case and said vehicle frame and adapted to be operated in response to a change in the height between said axle case and said vehicle frame, said link mechanism comprising a first link connected to said vehicle frame, a second link connected to said axle case and a third link for pivotably connecting said first link with said second link;

a vehicle height control valve mounted to said vehicle frame and connected to an operation output portion of said first link of said link mechanism, said vehicle height control valve being provided between a pressure air source and said air spring to control supply, discharge and stop of said operating fluid with respect to said air spring in such a manner as to stop the supply and discharge of said operating fluid when said link mechanism is in a neutral position, supply said operating fluid to said air spring when said link mechanism is operated in one direction and discharge said operating fluid from said air spring when said link mechanism is operated in another direction counter to said one direction;

damper means pivotally connected between said operation output portion of said first link of said link mechanism and said vehicle frame for damping a relatively short fluctuating operation of said link mechanism to restrict operation of said vehicle height control valve in response thereto and for providing a relatively long ordinary operation of said link mechanism to responsively operate said vehicle height control valve; and elastic means formed of a rubber material and fixedly provided between said axle case and a connecting portion of said second link of said link mechanism connected to said axle case for elastically absorbing and accumulating torsional energy due to relative rotational displacement between said axle case and said connecting portion of said second link of said link mechanism to ordinarily operate said link mechanism.

* * * * *